United States Patent [19]

Jarrett et al.

[11] 3,993,628

[45] Nov. 23, 1976

[54] MIXTURE OF THERMOPLASTIC AROMATIC COPOLYETHERKETONE/SULPHONE AND A SULPUR-CONTAINING MATERIAL AND METHOD OF CROSSLINKING THE SAME

[75] Inventors: Graham Jarrett, Hitchin; Philip Anthony Staniland, Welwyn, both of England

[73] Assignee: Imperial Chemical Industries Limited, London, England

[22] Filed: Sept. 30, 1974

[21] Appl. No.: 510,572

[30] Foreign Application Priority Data

Oct. 12, 1973   United Kingdom............... 47683/73

[52] U.S. Cl. ............................ 260/49; 260/79.3 M
[51] Int. Cl.$^2$........................................ C08G 75/23
[58] Field of Search ........................ 260/49, 79.3 M

[56] References Cited

UNITED STATES PATENTS

| | | | |
|---|---|---|---|
| 3,441,538 | 4/1969 | Marks................................. | 260/49 |
| 3,634,355 | 1/1972 | Barr et al............................. | 260/49 |
| 3,751,398 | 8/1973 | Dahl.............................. | 260/79.3 M |
| 3,787,363 | 1/1974 | Staniland et al..................... | 260/49 |
| 3,928,295 | 12/1975 | Rose.............................. | 260/79.3 M |

*Primary Examiner*—Donald E. Czaja
*Assistant Examiner*—H. H. Fletcher
*Attorney, Agent, or Firm*—Cushman, Darby & Cushman

[57] ABSTRACT

A mixture of i) a thermoplastic copolyetherketone/-sulphone containing —AR—CO (75–90%) and —Ar—SO$_2$— (25–10%) repeat units wherein Ar is a bivalent aromatic radical which may vary from unit to unit and at least some of the Ar groups contain aromatic ether links ortho or para to at least one —CO— or —SO$_2$— group and ii) sulphur, a dithiol, or a polydisulphide in such a quantity that the amount of sulphur (as such or in thiol or disulphide groups) is 0.01 to 5% by weight of the combined weight of copolyetherketone/sulphone and sulphur. On heating this mixture to 300°–450° C the molecular weight of the polymer increases.

10 Claims, No Drawings

MIXTURE OF THERMOPLASTIC AROMATIC COPOLYETHERKETONE/SULPHONE AND A SULPUR-CONTAINING MATERIAL AND METHOD OF CROSSLINKING THE SAME

This invention relates to aromatic polymers and in particular it relates to compositions containing thermoplastic aromatic polymers containing ketone, sulphone and ether links. Said polymers are hereinafter referred to as thermoplastic aromatic copolyetherketone/sulphones.

Depending on the proportion of ketone to sulphone groups, the polymers may be crystalline or amorphous. Generally it is necessary that the polymer contains at least three ketone links to each sulphone link for the polymer to be crystalline.

The crystalline polymers are of particular utility in applications where the polymer is liable to be in contact with solvents such as degreasing fluids and hydraulic fluid at high temperatures e.g. >150° C. However for the best physical properties at such high temperatures, the polymer should have a high molecular weight. As the molecular weight increases, however, the ease of fabrication of the polymer decreases, especially if a melt processing technique is utilised.

Furthermore for said high temperature applications the best physical properties are obtained if the polymer is cross-linked.

We have found that the molecular weight of certain thermoplastic aromatic copolyetherketone/ sulphones can be increased, and the polymer cross-linked by heating the polymer in admixture with sulphur or certain sulphur containing compounds at temperatures in the range 300° to 450° C.

In our U.S. Pat. No. 3,787,363 we disclosed that certain thermoplastic aromatic polyethersulphones could be so cross-linked. However the corresponding polyetherketones, i.e. without any sulphone links, do not exhibit an increase in molecular weight upon heating.

Accordingly we provide a mixture comprising i) at least one thermoplastic aromatic copolyetherketone/ sulphone containing repeat units —Ar—CO— and —Ar—SO$_2$— where Ar is a bivalent aromatic radical, which may vary from unit to unit in the polymer chain, and at least some of the Ar groups have an aromatic ether group in the polymer chain ortho or para to at least one of said —CO— or —SO$_2$— groups, said copolyetherketone/ sulphone containing from 3 to 9 —CO— links per —SO$_2$— link, and ii) at least one sulphur containing material selected from elemental sulphur, aliphatic or aromatic dithiols, and aliphatic or aromatic polydisulphides, the amount of said sulphur containing material being such that the amount of sulphur present as free sulphur, or as the sulphur in the thiol or disulphide groups, is from 0.01 to 5% by weight, based on the combined weight of said polyetherketone/ sulphone and said sulphur.

Aromatic polyetherketones, i.e. polymers comprising the repeat units

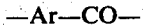

in which Ar is a bivalent aromatic radical, which may vary from unit to unit in the polymer chain, and in which at least some of the Ar groups have an aromatic ether group in the polymeric chain ortho or para to at least one —CO— group, and methods of making them are described in, inter alia, British Pat. specifications Nos. 971,227; 1,078,234; 1,102,679; 1,133,561; 1,153,035; 1,153,527; 1,164,817; Netherlands patent specifications 72 02048 and 72 02049; and in our U.S. application Ser. No. 467,798, now U.S. Pat. No. 3,928,295.

The copolyetherketone/sulphones used in the present invention are similar to the aforesaid polyetherketones save that 10 to 25% of the —CO— groups have been replaced by —SO$_2$— groups. These copolyetherketone/sulphones may be made by analogous methods to the polyetherketones, replacing an appropriate proportion of one or more —CO— containing monomers by —SO$_2$— containing monomers. The production of such copolyethekeetone/sulphones is described in, inter alia, aforesaid U.S. application Ser. No. 467,798, now U.S. Pat. No. 3,928,295.

The radicals Ar are preferably of the structure

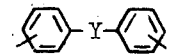

(where Y is oxygen or the residue of an aromatic diol such as a 4,4'-bisphenol) or

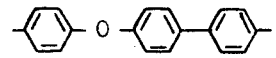

Other Ar radicals that may be used include

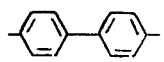 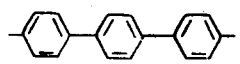

provided that, as indicated hereinbefore, at least some of the other Ar radicals in the polymer chain contain aromatic ether links.

The aromatic radicals Ar are preferably free of aliphatic hydrocarbon radicals either as linking groups or as aromatic ring substitutes. The polymers preferably have an essentially all (>95%) para configuration. The preferred Ar group is

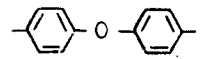

The copolyketone/sulphones in the mixture of the present invention preferably have a reduced viscosity of at least 0.3 as measured at 25° C on a solution of the polymer in concentrated sulphuric acid containing 1 g of polymer in 100 cm$^3$ of solution (i.e. 1% w/v). Most preferably the copolyketone/sulphone has a reduced viscosity of between 0.8 and 3.0 and an absorbance of less than 1.5 (desirably less than 0.5 and most desirably less than 0.2) at a wavelength of 550 nm in a 10 mm cell on a 1% w/v solution in concentrated sulphuric acid.

The second component of the mixture of the present invention is elemental sulphur, an aliphatic or aromatic dithiol or polydisulphide. Of the dithiols, aromatic dithiols of the type HS—R—SH where R is a bivalent aromatic radical are preferred because aliphatic dithiols are generally volatile at the reaction temperature and may liberate hydrogen sulphide as a by-product. Preferred aromatic dithiols are biphenyl-4,4'-dithiol, bis-(4-mercapto phenyl) ether and bis-(4-mercapto phenyl) sulphone. Polydisulphides that may be used have repeat units having the formula —R—S—S— where R is a bivalent aliphatic and/or aromatic radical.

The amount of this second component to be utilised is calculated from the amount of sulphur present as elemental sulphur, or as the sulphur in the thiol (—SH) or disulphide (—S—S—) groups. The second component is preferably present in such an amount that the sulphur content is 0.05 to 2% by weight, based on the weight of the copolyetherketone/sulphone and said sulphur.

The polymeric materials of increased molecular weight are prepared by heating a mixture of a thermoplastic aromatic copolyketone/sulphone with the sulphur containing material at a temperature between 300° C and 450° C, preferably between 340° C and 400° C. At temperatures below 300° C the reaction is very slow and at temperatures above 450° C, the aromatic copolyketone/sulphone may begin to decompose.

When the sulphur content of the mixture of the invention is more than 0.1% and the reaction time and temperature are sufficiently high, the polymeric materials obtained are cross-linked and essentially insoluble in solvents for thermoplastic aromatic copolyketone/sulphones (e.g. concentrated sulphuric acid) and are not thermoplastic and have improved toughness.

If the sulphur content of the mixture is less than 0.1%, or if the reaction time or temperature are lower than required for cross-linking, the polymeric materials obtained may still be thermoplastic, although of increased molecular weight, and soluble in solvents for the copolyketone/sulphone precursors.

Compared with the thermoplastic aromatic copolyketone/sulphone precursor, the materials of increased molecular weight have improved resistance to ageing under stress at elevated temperatures and to stress cracking.

In order to prepare the mixtures of the invention, the thermoplastic aromatic copolyketone/sulphone and the sulphur containing material may be mixed as dry powders. The mixing should take place at a temperature below that at which chemical reaction occurs, or if carried out at a higher temperature, for a time such that the effects of the reaction are insignificant. The mixture may then be moulded or formed into any desired shape prior to heating to a temperature at which the polymeric product of the invention is formed.

If the mixture of the invention contains elemental sulphur as the sulphur containing material, since sulphur dioxide is evolved on heating such a mixture, it is preferable that the mixture of the invention is moulded under pressure if an unfoamed or bubble-free moulding is required and that the concentration of elemental sulphur is 1% by weight or less. A foamed product may be prepared if the mixture is heated essentially in the absence of imposed pressure. A preferred concentration range of elemental sulphur is then 1 to 5% by weight if the foam is to be produced using only elemental sulphur. A foamed product may also be prepared by blending the mixture of the invention with a conventional foaming or blowing agent, which preferably reacts between 300° C and 450° C.

The mixtures of the invention may be used in the manufacture of objects containing the new polymeric materials in the form of components such as, for example heat-resistant foams, moulding, films and coatings and in particular as heat-resistant insulation of electrical conductors.

The invention is illustrated by the following example.

Dipotassium salt of bis-(4-hydroxyphenyl) ketone (dehydrated; 21.8140 g; 0.0712 mole), bis-(4-chlorophenyl) ketone (10.7980 g; 0.0430 mole; melting point 146.0 to 147.0° C distilled and then recrystallised from methyl ethyl ketone), bis-(4-chlorophenyl) sulphone (8.2378 g; 0.0286 mole; melting point 148.0° to 149.0° C recrystallised from iso-propanol) and recrystallised diphenyl sulphone (53 g) were charged to a glass flask (capacity 500 cm³) fitted with a stirrer, thermocouple probe, nitrogen purge and air condenser. The flask was heated on a solder bath at 290° to 300° C and maintained at that temperature for 17 hours. Methyl chloride was then bubbled through the polymer solution for twenty minutes during which the initially yellow solution became almost colourless. The product was cooled and the resultant solid mass was pulverised (particle size 1 mm) and polymer worked-up by boiling twice with acetone for 30 minutes; boiling with water containing a trace of acetic acid; boiling with water and finally boiling with methanol. The polymer was then dried for 24 hours in an air oven at 70° C.

The polymer had a reduced viscosity of 0.88 as measured at 25° C on a solution (1% w/v) of the polymer in concentrated sulphuric acid (density 1.84). The solution was pale yellow and had an absorbance of 0.17 at 550 nm in a 10 mm cell. The polymer consisted of units having the formula

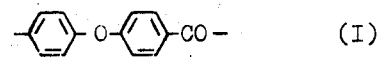 (I)

and

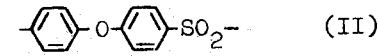 (II)

in ratio 80:20.

A sample of the polymer was powder blended at room temperature with elemental sulphur to give a blend containing 1% of sulphur by weight. Samples of the blend and unblended polymer were fabricated into film by compression-moulding at 360° C for 15 minutes. The film from the blend was tougher and swelled slightly when immersed in concentrated sulphuric acid (density 1.84) whereas the film made from the polymer alone was less tough and dissolved in concentrated sulphuric acid.

A polymer similar to that described above but consisting of repeating units I and II in ratio 90:10 was mixed with elemental sulphur (1% by weight) and compression-moulded into film at 380° C for 15 minutes. The resultant film was insoluble in concentrated sulphuric acid.

Similar blends were prepared from polymers consisting of (a) unit I alone, and (b) units I and II in ratio 95:5. On compression-moulding at 400° C for 15 minutes, blend from polymer (a) was found to have decomposed without formation of a coherent film but blend from polymer (b) formed a coherent film which crazed and broke up in concentrated sulphuric acid.

We claim:

1. A mixture comprising i) at least one thermoplastic aromatic copolyetherketone/sulphone containing repeat units —Ar—CO— and —Ar—SO$_2$— where Ar is a bivalent aromatic radical, which may vary from unit to unit in the polymer chain, and at least some of the Ar groups have an aromatic ether group in the polymer chain ortho or para to at least one of said —CO— or —SO$_2$— groups, said copolyetherketone/sulphone containing from 3 to 9 —CO— links per —SO$_2$— link and having a reduced viscosity of at least 0.3 as measured at 25° C on a solution of the polymer in concentrated sulphuric acid containing 1 g of polymer in 100 cm$^3$ of solution, and ii) at least one sulphur containing material selected from elemental sulphur, aliphatic or aromatic dithiols, and aliphatic or aromatic polydisulphides, the amount of said sulphur containing material being such that the amount of sulphur present as free sulphur, or as the sulphur in the thiol or disulphide groups, is from 0.01 to 5% by weight, based on the combined weight of said polyetherketone/sulphone and said sulphur.

2. A mixture as claimed in claim 1 wherein the amount of said sulphur containing material is such that the amount of sulphur present as free sulphur, or as the sulphur in the thiol or disulphide groups, is from 0.05 to 2% by weight, based on the combined weight of polyetherketone/sulphone and said sulphur.

3. A mixture as claimed in claim 1 wherein at least some of the radicals Ar have the structure

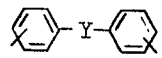

where Y is oxygen or the residue of an aromatic diol.

4. A mixture as claimed in claim 3 wherein at least some of the radicals Ar have the structure

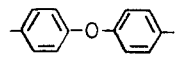

5. A mixture as claimed in claim 1 wherein at least some of the radicals Ar have the structure

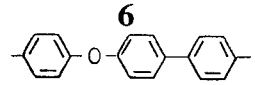

6. A mixture as claimed in claim 1 wherein the sulphur containing material is elemental sulphur.

7. A process for the production of an aromatic copolyetherketone/sulphone of increased molecular weight comprising heating, at temperatures between 300° C and 450° C, a mixture comprising i) at least one thermoplastic aromatic copolyetherketone/sulphone containing repeat units —Ar—CO— and —Ar—SO$_2$— where Ar is a bivalent aromatic radical, which may vary from unit to unit in the polymer chain, and at least some of the Ar groups have an aromatic ether group in the polymer chain ortho or para to at least one of said —CO— or —SO$_2$— groups, said copolyetherketone/sulphone containing from 3 to 9 —CO— links per —SO$_2$— link and having a reduced viscosity of at least 0.3 as measured at 25° C on a solution of the polymer in concentrated sulphuric acid containing 1 g of polymer in 100 cm$^3$ of solution, and ii) at least one sulphur containing material selected from elemental sulphur, aliphatic or aromatic dithiols, and aliphatic or aromatic polydisulphides, the amount of said sulphur containing material being such that the amount of sulphur present as free sulphur, or as the sulphur in the thiol or disulphide groups, is from 0.01 to 5% by weight, based on the combined weight of said polyetherketone/sulphone and said sulphur.

8. A process as claimed in claim 7 wherein the mixture is heated at temperatures in the range 340° C to 400° C.

9. A process as claimed in claim 7 wherein the sulphur containing material is elemental sulphur and is present in a concentration of less than 1% by weight, based on the weight of sulphur and copolyetherketone/sulphone and said heating is effected under pressure.

10. A process according to claim 7 wherein a foamed product is made by heating the mixture in the absence of imposed pressure, said mixture containing 1 to 5% by weight of elemental sulphur as the sulphur containing material, based on the combined weights of the copolyetherketone/sulphone and said sulphur.

* * * * *